Nov. 1, 1927.

L. B. HALPHEN

GAUGE FOR AXLES

Filed July 24, 1925

1,647,864

Louis B. Halphen
INVENTOR

BY Victor J. Evans
ATTORNEY

Patented Nov. 1, 1927.

1,647,864

UNITED STATES PATENT OFFICE.

LOUIS BRYAN HALPHEN, OF OPELOUSAS, LOUISIANA.

GAUGE FOR AXLES.

Application filed July 24, 1925. Serial No. 45,881.

The object of this invention is to provide a gauge for correctly alining the front axle of a Ford car.

A further object is to provide a gauge comprising a plurality of vertically adjustable elements, one of which has a tapered end, said gauge or gauges to be mounted in the vertical bores of the axle through which the perches for the spring pass, so that a bent axle may be brought to a position in which a cord connecting the upper eye members on the forked ends of the axle will be in alinement with the tapered ends of the gauges, indicating that the eye members and the bores thereof are in correct position with reference to the bores for the perches.

With the foregoing and other objects in view, the invention consists in the novel construction and arrangement of elements described, illustrated and claimed, it being understood that modifications may be made within the scope of the claims without departing from the spirit of the invention.

In the drawings forming part of this application:

Figure 1:
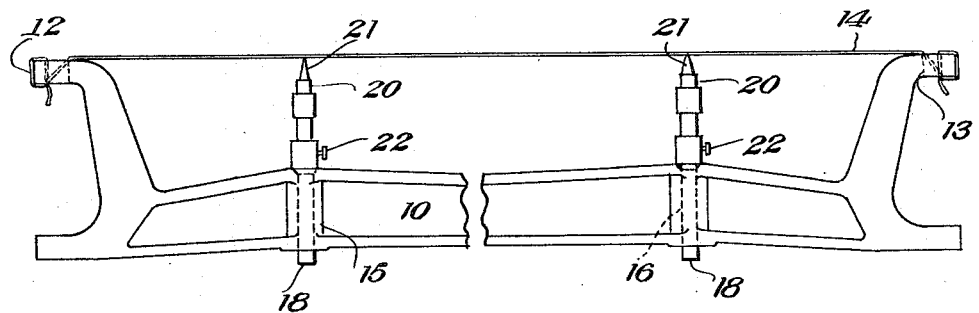
Figure 1 shows a front axle of a Ford car, in elevation, with my special form of gauging means applied thereto.
Figure 2:
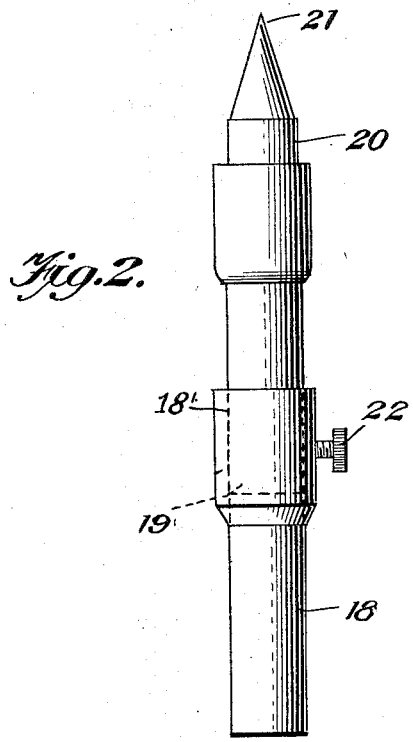
Figure 2 is an elevation of the gauging device per se.
Figure 3:
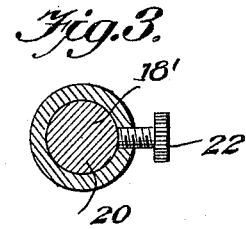
Figure 3 is a transverse section, thru the structure of Figure 2, approximately in the plane of the shank of the screw 22.

The forked front axle of a Ford car is designated 10, the eye member at the left being shown at 12 and that at the right, as shown in Figure 1, being designated 13. A cord or fine wire 14 is passed through the eye members, that is, through the usual bolt holes, and is temporarily secured, for gauging purposes. Axle 10 is further provided with the usual bores 15 and 16 for the perches of the spring to be mounted on the front axle, the spring not being illustrated in this case.

The gauge includes a stem or standard 18 provided with a vertical bore 19 in its upper end, and the shank portion of the standard 18 is proportioned to fit within either of said bores 15 or 16 in the axle.

The upper element 20 of the gauging device includes a tapered upper end 21, the element or pin 20 being proportioned for insertion within bore 19, and being adapted to be retained therein by means of set screw or thumb screw 22. Bore 19 is formed within enlarged end 18' of standard 18.

Figure 1 shows the use of two gauges in preparing for the alinement of the axle, which it may be assumed has been bent, owing to an accident to the car; the gauges are separately adjusted and are placed within the bores 15 and 16, and the axle is to be restored to position so that the upper ends of the pins 20 will be in alinement with cord or wire 14 and with the apertures for the bolts to be inserted in the eye members 12 and 13, in re-assembling the car. In actual use the mechanic is enabled to make the required repairs in very much less time than is required under ordinary conditions and when proceeding in the usual manner.

Having thus described the invention, what is claimed as new, is:—

1. A gauge for an axle, said gauge comprising a stem having a bore in one end thereof and being proportioned for mounting in the vertical bore provided for a spring perch, a device vertically adjustable in the bore first named, and means for retaining this device in an adjusted position.

2. The combination of a plurality of gauging devices to be mounted in an axle having forked ends, said ends being drilled vertically to provide bores for wheel mounting elements, and the axle also being drilled vertically for mounting the perches of a spring, the gauging elements to be mounted in the bores last named, of means adapted for connection with the bores in the upper portions of opposite forks and adapted to aline with the gauge elements, when the axle is true.

In testimony whereof I affix my signature,

LOUIS BRYAN HALPHEN.